United States Patent
Amstutz et al.

(10) Patent No.: US 12,122,349 B1
(45) Date of Patent: Oct. 22, 2024

(54) TORQUE MONITORING FOR MULTI-ACTUATOR VEHICLE SYSTEMS

(71) Applicant: GM Global Technology Operations LLC, Detroit, MI (US)

(72) Inventors: Samuel Amstutz, Howell, MI (US); Cameron MacDonald, Commerce Charter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/423,932

(22) Filed: Jan. 26, 2024

(51) Int. Cl.
*B60W 10/08* (2006.01)
*B60W 20/10* (2016.01)

(52) U.S. Cl.
CPC .............. *B60W 10/08* (2013.01); *B60W 20/10* (2013.01); *B60W 2510/083* (2013.01); *B60W 2710/0666* (2013.01); *B60W 2710/083* (2013.01)

(58) Field of Classification Search
CPC ................. B60W 10/08; B60W 20/10; B60W 2510/083; B60W 2710/0666; B60W 2710/083
See application file for complete search history.

(56) References Cited

U.S. PATENT DOCUMENTS

| 2018/0105047 A1* | 4/2018 | Yoo | B60K 6/48 |
| 2019/0143960 A1* | 5/2019 | Johri | B60W 10/06 477/3 |
| 2019/0308607 A1* | 10/2019 | Ebus | B60W 10/08 |

FOREIGN PATENT DOCUMENTS

| CN | 104773160 B | * | 1/2019 | ............ B60K 6/365 |
| CN | 112977396 A | * | 6/2021 | ............ B60W 10/06 |
| JP | 2009196530 A | * | 9/2009 | |

* cited by examiner

*Primary Examiner* — Justin Holmes
(74) *Attorney, Agent, or Firm* — CANTOR COLBURN LLP

(57) ABSTRACT

A system for controlling torque in a vehicle includes a controller connected to a propulsion system having a plurality of independently controllable actuators configured to apply a combined torque. The controller is configured to perform a method including detecting a combined torque request indicating a total requested torque to be applied to the vehicle, where the total requested torque is split and a portion of the total requested torque is assigned to each actuator. The method further includes determining a torque command for each actuator, estimating a total applied torque provided to the vehicle, and based on a difference between the total applied torque and the total requested torque being greater than a first threshold, calculating an error value for each actuator, comparing each error value to a reference value, and performing a remedial action based on at least one error value exceeding the reference value.

20 Claims, 5 Drawing Sheets

|    | A1 | A2 | Sum | E  |      | MAC |      |
|----|----|----|-----|----|------|-----|------|
|    |    |    |     | SD | SALH | SD  | SALH |
| S1 | U  | U  | U   |    |      |     |      |
| S2 | U  | U  | A   | X  |      |     | X    |
| S3 | U  | A  | A   | X  |      |     | X    |
| S4 | A  | U  | A   | X  |      |     | X    |
| S5 | A  | A  | A   | X  |      | X   |      |

FIG. 3

TORQUE MONITORING FOR MULTI-ACTUATOR VEHICLE SYSTEMS

INTRODUCTION

The subject disclosure relates to vehicles, and more specifically, to systems, devices and methods for control of vehicle propulsion.

Vehicles, including gasoline and diesel power vehicles, fuel cell vehicles, as well as electric and hybrid electric vehicles, feature a variety of propulsion systems. Such propulsion systems can include multiple actuators. For example, a vehicle may have an internal combustion engine as a first actuator and one or more electric motors as additional actuators. In another example, a vehicle may have multiple electric motors driving different axles. Errors in application of torque by individual actuators can combine or stack, resulting in the overall torque exceeding prescribed limits or failing to conform with a driver's torque request.

SUMMARY

In one exemplary embodiment, a system for controlling torque in a vehicle includes a controller connected to a propulsion system having a plurality of independently controllable actuators, the plurality of actuators configured to apply a combined torque for propulsion of the vehicle. The controller is configured to perform a method including monitoring the propulsion system and detecting a combined torque request, the combined torque request indicating a total requested torque to be applied to the vehicle, where the total requested torque is split and a portion of the total requested torque is assigned to each actuator of the plurality of actuators. The method further includes determining a torque command for each actuator, each torque command prescribing an assigned amount of torque to be applied to a respective actuator, and during propulsion, estimating a total applied torque provided to the vehicle, and comparing the total applied torque to the total requested torque. The method further includes, based on a difference between the total applied torque and the total requested torque being greater than a first threshold, calculating an error value for each actuator, the error value being a difference between a constituent amount of torque applied by an actuator and the assigned amount of torque, comparing each error value to a reference value, and performing a remedial action based on at least one error value exceeding the reference value.

In addition to one or more of the features described herein, the remedial action includes disabling at least one actuator.

In addition to one or more of the features described herein, comparing each error value includes determining a largest error value, and performing the remedial action includes disabling an actuator associated with the largest error value based on the largest error value exceeding a second threshold.

In addition to one or more of the features described herein, each error value is compared to a respective error threshold, and performing the remedial action includes disabling an actuator having an error value that exceeds the respective error threshold.

In addition to one or more of the features described herein, the method includes re-estimating the total applied torque, and comparing the re-estimated total applied torque to the first threshold.

In addition to one or more of the features described herein, the method includes disabling at least one additional actuator based on based on a difference between the re-estimated total amount of applied torque and the total requested torque being greater than the first threshold.

In addition to one or more of the features described herein, the method includes continuing to apply torque by one or more remaining active actuators, based on the re-estimated total amount of applied torque being less than or equal to the first threshold.

In addition to one or more of the features described herein, the plurality of actuators include a first actuator configured to drive a primary axle and a second actuator configured to drive a secondary axle.

In addition to one or more of the features described herein, the first actuator includes a combustion engine and the second actuator includes an electric motor.

In another exemplary embodiment, a method of controlling torque in a vehicle includes monitoring a propulsion system having a plurality of independently controllable actuators, the plurality of actuators configured to apply a combined torque for propulsion of the vehicle, and detecting a combined torque request, the combined torque request indicating a total requested torque to be applied to the vehicle, where the total requested torque is split and a portion of the total requested torque is assigned to each actuator of the plurality of actuators. The method also includes determining a torque command for each actuator, each torque command prescribing an assigned amount of torque to be applied to a respective actuator, and during propulsion, estimating a total applied torque provided to the vehicle, and comparing the total applied torque to the total requested torque. The method further includes, based on a difference between the total applied torque and the total requested torque being greater than a first threshold, calculating an error value for each actuator, the error value being a difference between a constituent amount of torque applied by an actuator and the assigned amount of torque, comparing each error value to a reference value, and performing a remedial action based on at least one error value exceeding the reference value.

In addition to one or more of the features described herein, the remedial action includes disabling at least one actuator.

In addition to one or more of the features described herein, comparing each error value includes determining a largest error value, and performing the remedial action includes disabling an actuator associated with the largest error value based on the largest error value exceeding a second threshold.

In addition to one or more of the features described herein, each error value is compared to a respective error threshold, and performing the remedial action includes disabling an actuator having an error value that exceeds the respective error threshold.

In addition to one or more of the features described herein, the method includes re-estimating the total applied torque, and comparing the re-estimated total applied torque to the first threshold.

In addition to one or more of the features described herein, the method includes disabling at least one additional actuator based on based on a difference between the re-estimated total amount of applied torque and the total requested torque being greater than the first threshold.

In addition to one or more of the features described herein, the method includes continuing to apply torque by one or more remaining active actuators, based on the re-estimated total amount of applied torque being less than or equal to the first threshold.

In yet another exemplary embodiment, a vehicle system includes a propulsion system having a plurality of independently controllable actuators, the plurality of actuators configured to apply a combined torque for propulsion of a vehicle, and a controller. The controller is configured to perform a method that includes monitoring the propulsion system and detecting a combined torque request, the combined torque request indicating a total requested torque to be applied to the vehicle, wherein the total requested torque is split and a portion of the total requested torque is assigned to each actuator of the plurality of actuators. The method also includes determining a torque command for each actuator, each torque command prescribing an assigned amount of torque to be applied to a respective actuator, and during propulsion, estimating a total applied torque provided to the vehicle, and comparing the total applied torque to the total requested torque. The method further includes, based on a difference between the total applied torque and the total requested torque being greater than a first threshold, calculating an error value for each actuator, the error value being a difference between a constituent amount of torque applied by an actuator and the assigned amount of torque, comparing each error value to a reference value, and performing a remedial action based on at least one error value exceeding the reference value.

In addition to one or more of the features described herein, the remedial action includes disabling at least one actuator.

In addition to one or more of the features described herein, comparing each error value includes determining a largest error value, and performing the remedial action includes disabling an actuator associated with the largest error value based on the largest error value exceeding a second threshold.

In addition to one or more of the features described herein, each error value is compared to a respective error threshold, and performing the remedial action includes disabling an actuator having an error value that exceeds the respective error threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 depicts examples of operating states achievable using the method of FIGS. 2A and 2B.

DETAILED DESCRIPTION

Figure 1:
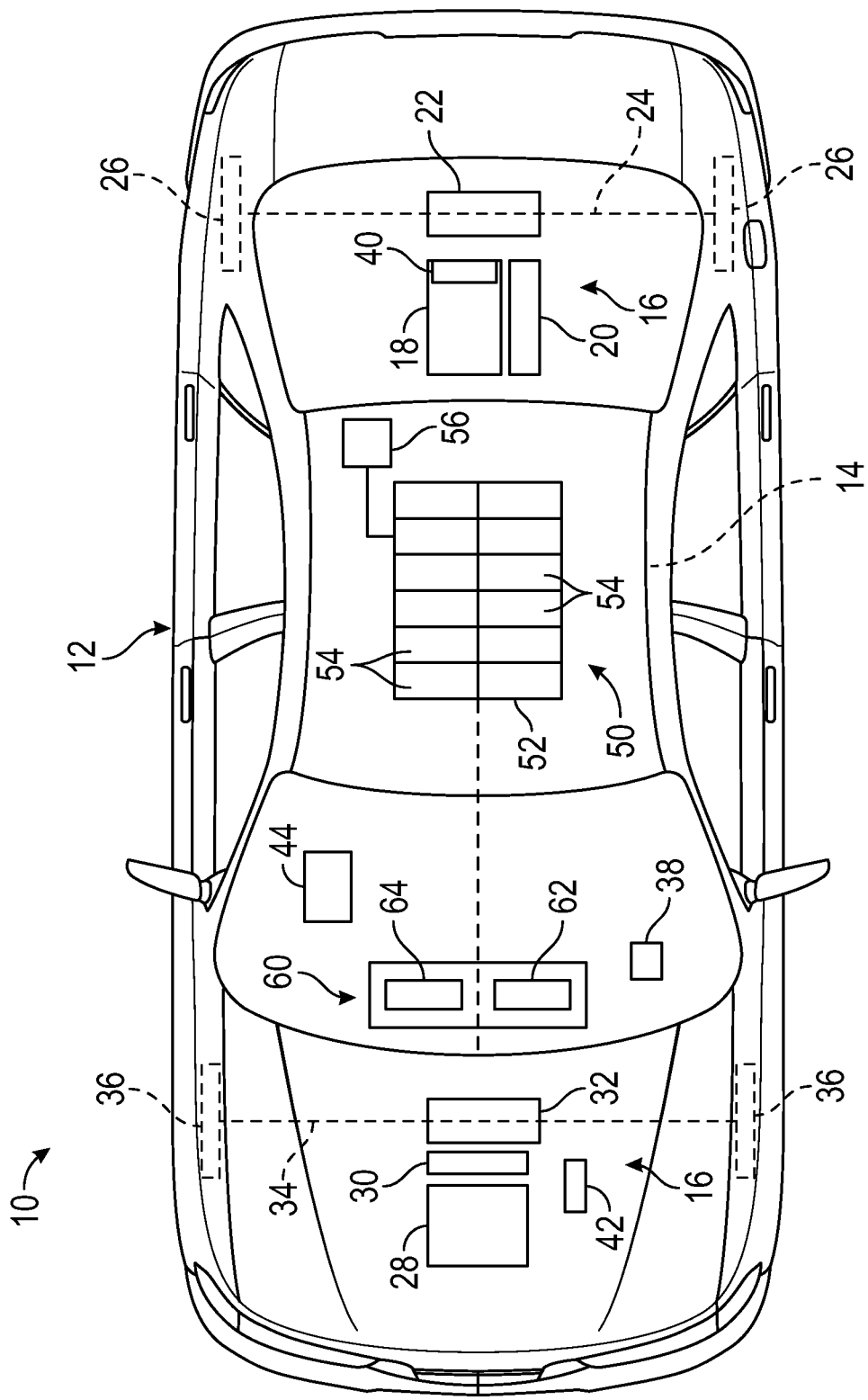
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for monitoring vehicle propulsion in a vehicle having multiple independently controlled actuators. An "actuator" is any device or system that is controllable to apply torque to a vehicle, such as a combustion engine or electric motor. For example, the vehicle may be a hybrid vehicle, or an electric vehicle having independent electric motors. In another example, the vehicle includes a primary actuator in the form of a combustion engine, and a secondary actuator in the form of an electric motor for supplementing propulsion.

An embodiment of a method includes monitoring a vehicle propulsion system during vehicle operation, which includes detecting a torque request (e.g., from a driver engagement with an acceleration pedal, or from an autonomous control system). The torque request (also referred to as a "combined torque request") prescribes a total amount of torque requested for propulsion. The combined torque request is split among a plurality of independently controllable actuators and a command is sent to each actuator to assign a portion of the total requested torque.

A controller detects an amount of torque ("constituent torque") applied by each actuator, and combines the constituent torques to calculate a total applied torque. The total applied torque is compared to the total requested torque to calculate a difference therebetween. If the difference exceeds a first threshold difference, the actuators are individually evaluated to determine a difference ("error" or "error value") between an actual amount of torque applied by an actuator and a commanded or assigned torque. A remedial action is performed if, for example, a largest error value exceeds a second threshold, or if an error value associated with an actuator exceeds a respective threshold (e.g., a threshold specific to that actuator). The remedial action many include disabling one or more actuators to bring the total applied torque to within the total requested torque. In an embodiment, the remedial action includes disabling one or more actuators, and allowing at least one actuator to remain active to allow the vehicle to be moved off of a road or to a desired location.

Embodiments described herein present numerous advantages and technical effects. The embodiments provide for improvements in diagnostics, allowing for more granular identification of errors in a propulsion system. In addition, the embodiments provide for various remedial actions that are not allowable in current multi-actuator propulsion systems. For example, existing diagnostic systems for multi-actuator vehicles can assess errors in propulsion, but are not capable of evaluating individual actuator error contributions. The embodiments address this challenge by providing for individual actuator assessments, and also allow for maintaining some level of propulsion by operating a subset of the actuators.

The embodiments are not limited to use with any specific vehicle and may be applicable to various contexts. For example, embodiments may be used with automobiles, trucks, construction equipment, farm equipment, automated factory equipment and/or any other device or system having multiple propulsion systems.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion systems 16 and other vehicle components, such as a braking subsystem, a suspension system, a steering subsystem, and if the vehicle is a hybrid electric vehicle, a fuel injection subsystem, an exhaust subsystem and others.

In an embodiment, the propulsion system 16 forms at least part of a multi-actuator powertrain system that includes at least two independent torque-generating devices (referred to herein as "actuators"). The actuators are independently controllable, so that each actuator can apply a selected amount of torque to an axle based on a combined torque request.

For example, the propulsion system 16 includes a first actuator 18 in the form of a combustion engine 18 for applying torque, and other components for supporting engine operation, such as a cooling system 20. The engine 18 is connected to a transmission system 22 for controlling the transfer of torque from the engine 18 to a rear drive shaft 24, also referred to as a primary axle 24. The primary axle 24 is connected to rear wheels 26. The engine 18 may be coupled to the rear drive shaft 24 as shown, or alternatively coupled to a front drive shaft 34 (in which case the front drive shaft 34 may be considered the primary axle).

The propulsion system 16 also includes an electric drive system, which is provided to supply additional torque (e.g., in a high performance mode), and may also be configured to propel the vehicle 10 alone (e.g., if the combustion engine 18 malfunctions). For example, the vehicle 10 includes at least one electric motor 28 and at least one inverter 30. The inverter 30 (e.g., traction power inverter unit or TPIM) converts direct current (DC) power from a high voltage (HV) battery pack 52 to poly-phase (e.g., two-phase, three-phase, six-phase, etc.) alternating current (AC) power to drive the motor 28. The motor 28 is connected to a gearbox 32 for controlling transfer of torque from the motor 28 to the drive shaft 34 (also referred to as a secondary axle 34) and front wheels 36.

The propulsion system 16 is not limited to the configuration, number of actuators or type of actuators shown in FIG. 1. There may be any number of actuators connected to each axle 24,34. For example, the vehicle 10 can be configured as a hybrid vehicle including a front combustion engine and electric motor positioned toward the front of the vehicle 10. In another example, the vehicle 10 is a fully electric vehicle having one electric motor, or multiple electric motors (e.g., a motor for each axle, multiple motors on an axle, or a motor for each wheel).

One or more processing devices are included to control operation of the propulsion system 16. The one or more processing devices are configured to control the torque output of the propulsion system 16 based on driver torque requests, which may be provided via a gas pedal or acceleration pedal 38.

In an embodiment, an engine control unit (ECU) 40 is configured to receive torque requests and control the engine 20, and a motor control unit (MCU) 42 is configured to control application of torque by the motor 30. A processing device, referred to as a controller 44, may be provided to process torque requests and coordinate control of the engine and motor as described herein. For example, the controller 46 is configured to provide electric all-wheel drive (AWD) capability, which allows torque to be selectively distributed among the axles. It is noted that embodiments are not so limited and may use any number or combination of processing devices.

The motor 28, as well as other vehicle components, are electrically connected to a battery system 50. The battery system 50 may be configured as a rechargeable energy storage system (RESS).

In an embodiment, the battery system 50 includes a battery assembly such as the battery pack 52. The battery pack 52 includes a plurality of battery modules 54, where each battery module 54 includes a number of individual cells (not shown). The battery system 50 may also include a monitoring unit 56 (e.g., RESS controller) configured to receive measurements from various sensors. Sensors may be provided for measuring various battery and environmental parameters, such as temperature, current and voltages.

The vehicle 10 also includes a computer system 60 that includes one or more processing devices 62 and a user interface 64. The computer system 60 may communicate with the controller 44 and/or other processor(s), for example, to provide commands thereto in response to a user input (e.g., torque commands). The various processing devices, modules and units may communicate with one another via a communication device or system, such as a controller area network (CAN) or transmission control protocol (TCP) bus. The various processing devices, modules and units may communicate with one another via other forms of communication, such as ethernet and wireless communication.

Figure 2A:
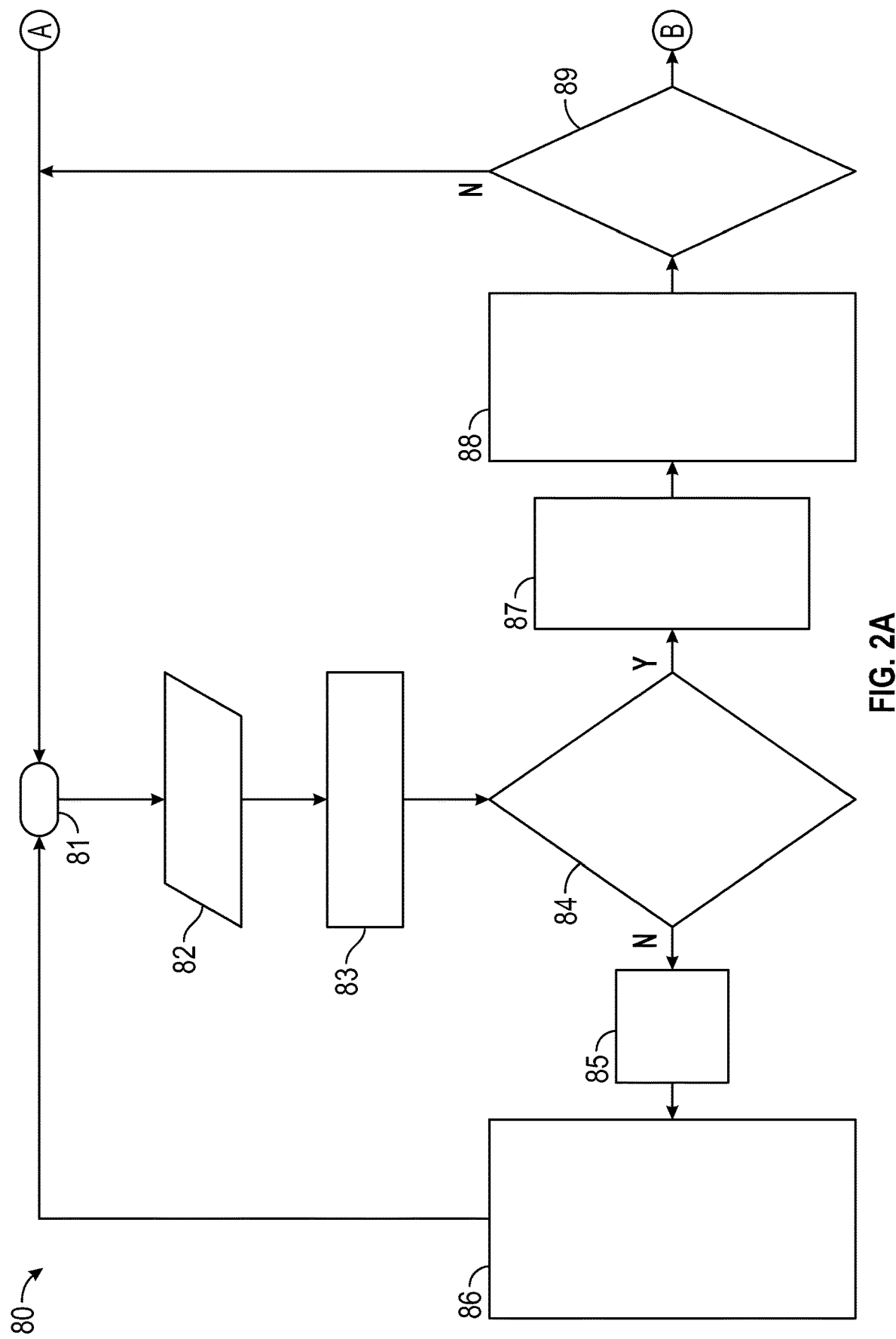
FIGS. 2A and 2B illustrate a block diagram depicting aspects of a method of controlling torque, in accordance with an exemplary embodiment.
Figure 2B:
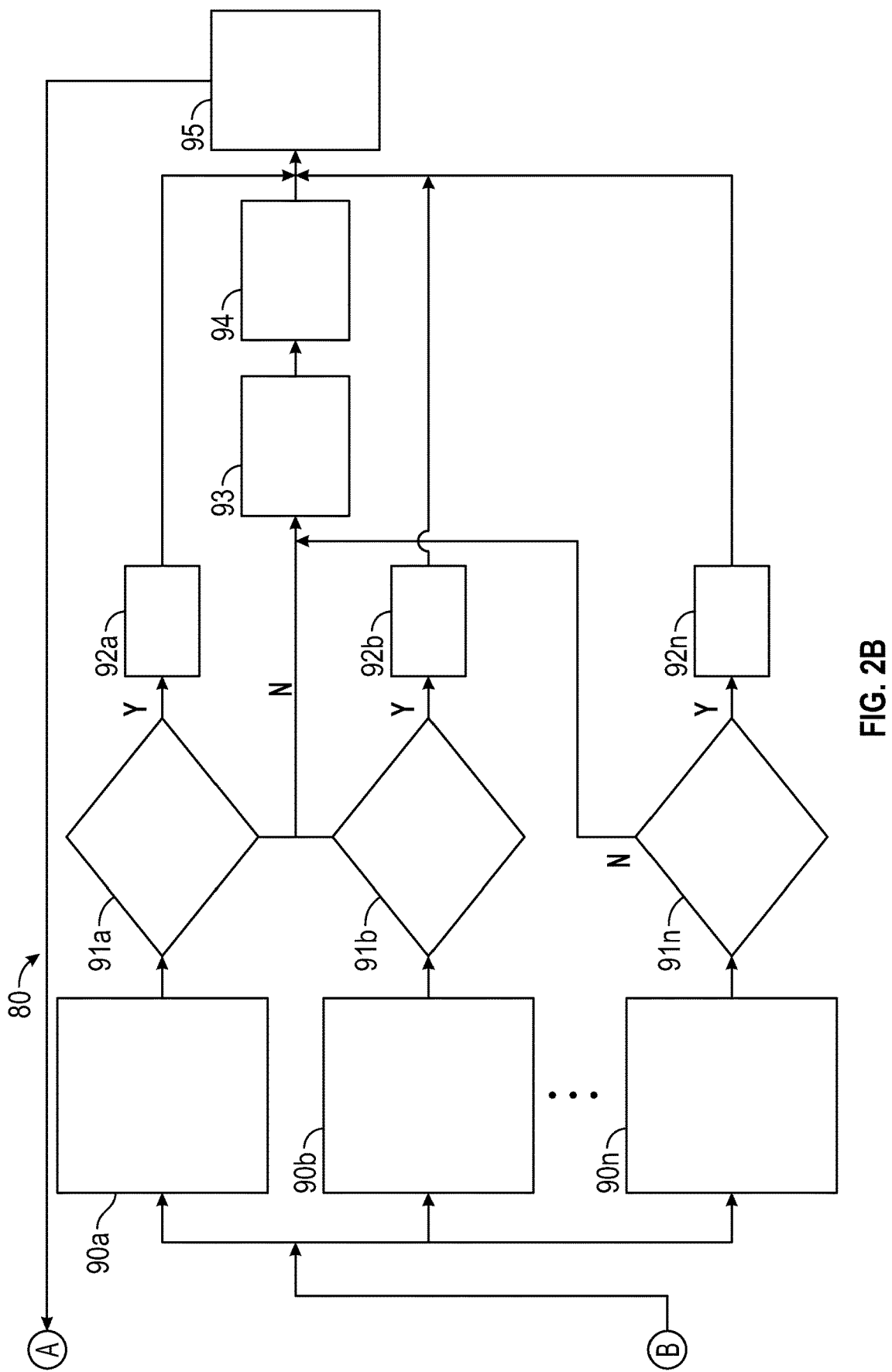

FIGS. 2A and 2B illustrate embodiments of a method 80 of controlling propulsion in a vehicle. Aspects of the method 80 may be performed by a processor or processors disposed in the vehicle 10. For illustration purposes, the method 80 is described as being performed by the controller 44 (optionally in coordination with the ECU 40 and the MCU 42).

It is noted that the method 80 is not so limited and may be performed by any suitable processing device or system, or combination of processing devices. In addition, the method 80 is not limited to use with the vehicle 10, as the method 80 may be performed in conjunction with any suitable vehicle or machine having a propulsion system with independently controllable actuators.

The method 80 includes a number of steps or stages represented by blocks 81-95. The method 80 is not limited to the number or order of steps therein, as some steps represented by blocks 81-95 may be performed in a different order than that described below, or fewer than all of the steps may be performed.

At block 81, the method 80 starts by initiating monitoring of a multi-actuator propulsion system, such as the propulsion system 16. Such monitoring is also referred to as multi-axle monitoring or multi-actuator monitoring.

At block 82, a request for torque is detected, referred to as a combined torque request. The combined torque request may be determined by the controller 44 or an existing control system (e.g., AWD control system). For example, a user (driver) engages the pedal 38, and the pedal position and/or movement is converted to a longitudinal torque value, referred to as the total requested torque. The longitudinal torque value may be determined via the pedal position and other parameters (e.g., vehicle speed, drivetrain losses, transmission states, etc.). The longitudinal torque value may account for other factors, such as other torque requests not primarily for longitudinal propulsion purposes (e.g., from chassis control interventions such as stability controls).

At block 83, upon determination of the total requested torque, the controller 44 or the AWD control system determines how the torque should be distributed among n actuators (n=2 or more). In an embodiment, the total requested torque is split into sub-torque requests ("torque commands") that are sent to the n actuators.

For example, an engine torque command directs the engine 18 to supply a proportion of the total requested torque to the primary axle 24, and a motor torque command directs the electric motor 28 to provide the remaining torque to the secondary axle 34.

At block 84, the controller 44 receives the individual torque commands and sums the torque commands to determine a total amount of requested torque (referred to as a "stacked requested torque value"). The stacked requested torque value is compared to the total requested torque, and a difference therebetween is calculated. The controller 44 determines whether the difference is less than or equal to a selected threshold difference.

At block 85, if the difference exceeds a selected threshold difference, the controller 44 determines that the torque distribution is not secure.

At block 86, the controller 44 directs the AWD control system to re-allocate the total requested torque, for example, by reducing the degrees of freedom of the split (e.g., an allowed torque to the secondary axle 34 is reduced). The number of actuators available for applying torque may also be reduced.

At block 87, if the difference between the stacked torque request and the total requested torque is less than or equal to the selected threshold difference, torque commands are sent to each actuator. For example, a first torque command is sent to the ECU 40 to apply a first amount of torque to the primary axle 24, and a second torque command is sent to the MCU 42 to apply a second amount of torque to the secondary axle 34.

At block 88, the actuators (e.g., the engine 18 and the electric motor 28) and the propulsion system (e.g., the propulsion system 16) are monitored, and a constituent amount of torque applied by each actuator is measured or estimated. The total amount of torque being applied by all actuators ("stacked torque") is compared to the total requested torque. A difference between the stacked torque and the total requested torque (referred to as a "stack up error") is calculated.

At block 89, the stack up error is compared to a selected threshold or metric ("first threshold"). If the stack up error is less than or equal to the first threshold, the method 80 loops back to block 81.

If the stack up error exceeds the first threshold, the method 80 proceeds to evaluate each actuator individually and perform a remedial action (See FIG. 2B). The remedial action may include disabling one or more actuators. The remedial action may be performed to remove one or more actuators to bring the total applied to torque in line with the total requested torque.

In some cases, the remedial action may include disabling at least one actuator, while maintaining at least one other actuator in an active state to allow the vehicle to be removed from a roadway, and/or driven to another location under reduced power.

For example, when the controller 44 detects that a stack up error associated with the engine 18 and the motor 28 exceeds the metric, but no single actuator would exceed the metric, a remedial action may be which only one of the actuators (e.g., the motor 28) is active. The active actuator is controlled to provide sufficient propulsion (which may be limited). This remedial action is referred to as single axle limp home (SALH), which allows the vehicle 10 to maintain propulsion while still removing the error stack up that would have led to a system level hazard.

Referring to FIG. 2B, at block 90a, a first amount of applied torque from a first actuator (e.g., the engine 18) is measured or estimated, and compared to a respective torque command. A difference (an "actuator error") between the applied torque and the commanded torque is calculated.

At block 91a, the actuator error is compared to a metric in the form of a selected threshold ("reference value"), and it is determined whether the actuator error exceeds the reference value. It is noted that the selected threshold or reference value may be the same or different for each actuator. The controller 44

At block 92a, if the actuator error exceeds the reference value, the first actuator is disabled.

at block 90b, a second amount of applied torque from a second actuator (e.g., the motor 28) is measured or estimated, and compared to a respective torque command. A difference (i.e., actuator error) between the applied torque and the commanded torque is calculated.

At block 91b, the actuator error is compared to a reference value (a selected threshold or other metric), and it is determined whether the actuator error exceeds the reference value.

At block 92b, if the actuator error exceeds the reference value, the second actuator is disabled.

For each additional actuator, a similar process is performed, denoted by blocks 90n, 91n and 92n.

At block 93, if none of the actuator errors exceed their respective reference values or metrics, the actuator error having the largest magnitude is determined, and the corresponding actuator is identified.

At block 94, the actuator error having the largest magnitude is compared to a metric in the form of a second threshold. If the actuator error is greater than the second threshold, the identified actuator is disabled.

For example, if the motor 28 has an actuator error that is larger than other actuators (including the engine 18 and any other existing actuators, such as additional electric motors), the motor 28 is disabled. Likewise, the engine 18 is disabled if its actuator error is largest (the vehicle 10 can limp home using the electric motor 28 if sufficient power is available).

At block 95, one or more additional actuators may be disabled in order to maintain a valid configuration. For example, if the identified actuator and another actuator are mechanically coupled to the same axle, both of those actuators may be disabled. "Disabling" may refer to shutting off an actuator, cutting of power to an actuator, and/or mechanically decoupling an actuator from an axle.

Remediation can be chosen to either allow a vehicle to enter single axle limp home if removal of one of the actuators brings the stack up error back below a metric. Remediation may include a full propulsion shutdown if all of the actuator's errors are large enough to violate a metric on their own.

In an embodiment, the method 80 loops back to block 81, where blocks 82-85 are repeated without the disabled actuator. For example, the requested torque is again determined (or the requested torque is considered to remain the same), and the various calculations are repeated using a new configuration in which the disabled actuator (or actuators) is excluded from the calculations and subsequent actuator control.

It is appreciated that the discussions herein are in the torque domain and more particularly in the axle torque domain. However, vehicle monitoring may initially occur in an acceleration domain and later converted into an axle torque domain.

FIG. 3 is a table depicting examples of operating states that can be realized using embodiments described herein, as compared to existing torque control systems. In this example, a vehicle includes two independent actuators, referred to as actuator "A1" and actuator "A2". For example, actuator A1 is the combustion engine 18 and actuator A2 is the electric motor 28.

The table shows various error conditions of the actuators A1 and A2, and operating states. An error condition may be an "under metric" condition (denoted as "U") in which an actuator error is less than or equal to an error threshold, or otherwise satisfies a selected metric or metrics. An "above metric" condition (denoted as "A") is a condition in which an actuator error is greater than an error threshold, or otherwise violates a selected metric or metrics.

The operating states include a shutdown state ("SD") in which all actuators are disabled, and a single axle limp home state ("SALH"). Columns labeled "E" represent operating states for the vehicle when controlled using an existing system, and columns labeled "MAC" represent operating states when multi-actuator control is performed according to embodiments described herein.

Each row indicates error conditions and operating states under different scenarios (S1-S5). In scenario S1, no errors are detected. In scenario S2, no single actuator is above metric, but a combination of the errors ("Sum") is above a threshold or violates a metric or metrics. In scenarios S3 and S4, one actuator is above metric. In scenario S5, both actuators are above metric.

As shown, if no errors are detected, all of the actuator errors, as well as the sum of the actuator errors (stacked errors), are below selected metrics, and the vehicle is operated normally. If no single actuator error is above a metric, but the stacked errors are above metric, existing torque systems require full shutdown. However, the methods described herein allow for one of the actuators to apply some amount of torque (single axle limp home or SALH).

If the stacked error is above a metric, but one of the actuators is below a metric, the methods described herein allow for SALH. In contrast, existing systems require full shutdown.

Figure 4:
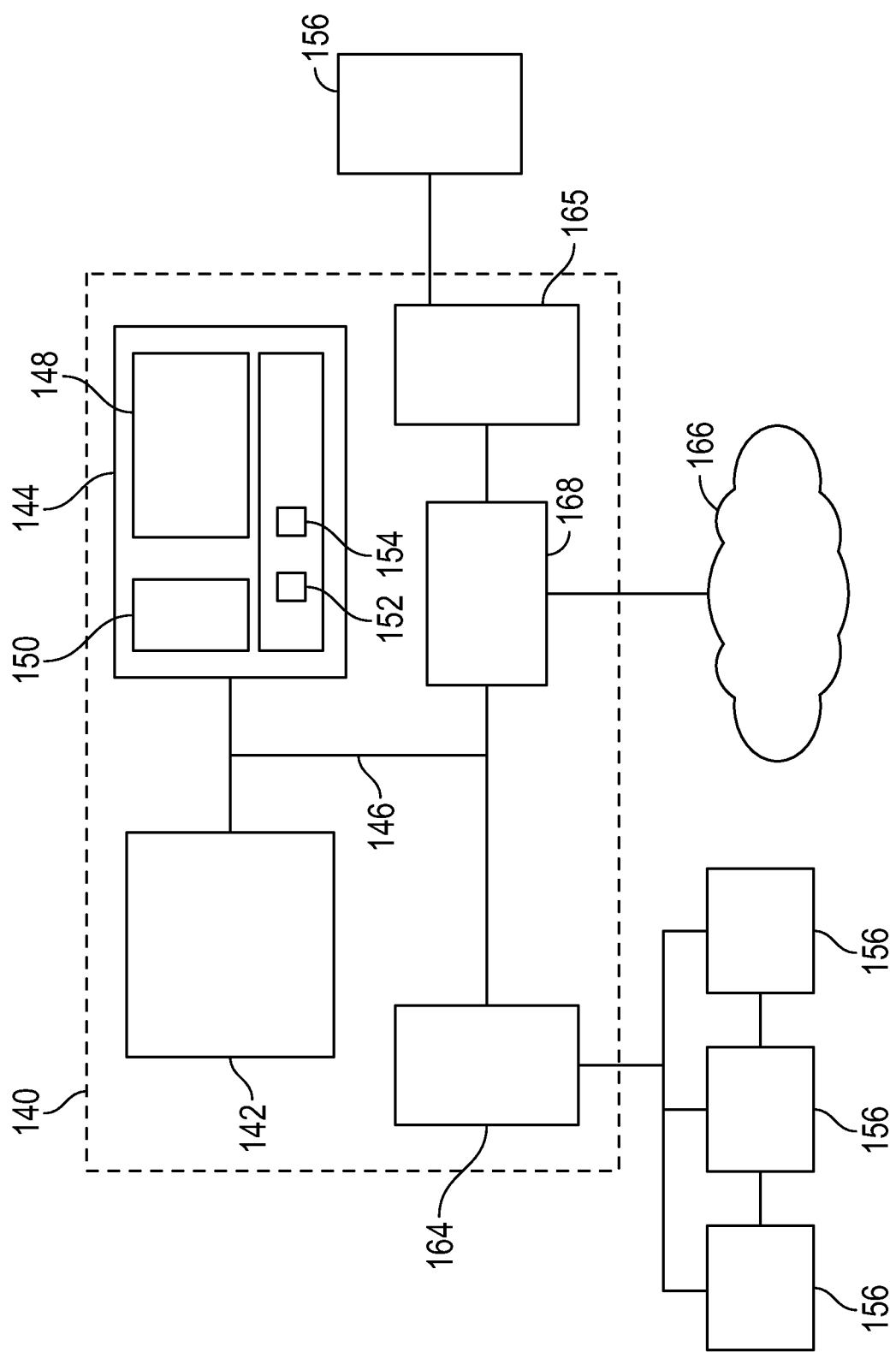
FIG. 4 depicts a computer system in accordance with an exemplary embodiment.

FIG. 4 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (i.e., at least one) of program modules that are configured to carry out functions of the embodiments described herein. For example, the system memory 144 stores various program modules that generally carry out the functions and/or methodologies of embodiments described herein. A module 152 may be included for performing functions related to acquiring signals and data, and a module 154 may be included to perform functions related to torque control as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling torque in a vehicle, comprising:
   a controller connected to a propulsion system having a plurality of independently controllable actuators, the plurality of actuators configured to apply a combined torque for propulsion of the vehicle, the controller configured to perform a method including:
   monitoring the propulsion system and detecting a combined torque request, the combined torque request indicating a total requested torque to be applied to the vehicle, wherein the total requested torque is split and a portion of the total requested torque is assigned to each actuator of the plurality of actuators;
   determining a torque command for each actuator, each torque command prescribing an assigned amount of torque to be applied to a respective actuator;
   during propulsion, estimating a total applied torque provided to the vehicle, and comparing the total applied torque to the total requested torque;
   based on a difference between the total applied torque and the total requested torque being greater than a first threshold, calculating an error value for each actuator, the error value being a difference between a constituent amount of torque applied by an actuator and the assigned amount of torque; and
   comparing each error value to a reference value, and performing a remedial action based on at least one error value exceeding the reference value.

2. The system of claim 1, wherein the remedial action includes disabling at least one actuator.

3. The system of claim 2, wherein comparing each error value includes determining a largest error value, and performing the remedial action includes disabling an actuator associated with the largest error value based on the largest error value exceeding a second threshold.

4. The system of claim 2, wherein each error value is compared to a respective error threshold, and performing the remedial action includes disabling an actuator having an error value that exceeds the respective error threshold.

5. The system of claim 2, wherein the method includes re-estimating the total applied torque, and comparing the re-estimated total applied torque to the first threshold.

6. The system of claim 5, wherein the method includes disabling at least one additional actuator based on based on a difference between the re-estimated total amount of applied torque and the total requested torque being greater than the first threshold.

7. The system of claim 5, wherein the method includes continuing to apply torque by one or more remaining active actuators, based on the re-estimated total amount of applied torque being less than or equal to the first threshold.

8. The system of claim 1, wherein the plurality of actuators include a first actuator configured to drive a primary axle and a second actuator configured to drive a secondary axle.

9. The system of claim 8, wherein the first actuator includes a combustion engine and the second actuator includes an electric motor.

10. A method of controlling torque in a vehicle, comprising:
    monitoring a propulsion system having a plurality of independently controllable actuators, the plurality of actuators configured to apply a combined torque for propulsion of the vehicle;
    detecting a combined torque request, the combined torque request indicating a total requested torque to be applied to the vehicle, wherein the total requested torque is split and a portion of the total requested torque is assigned to each actuator of the plurality of actuators;
    determining a torque command for each actuator, each torque command prescribing an assigned amount of torque to be applied to a respective actuator;
    during propulsion, estimating a total applied torque provided to the vehicle, and comparing the total applied torque to the total requested torque;
    based on a difference between the total applied torque and the total requested torque being greater than a first threshold, calculating an error value for each actuator, the error value being a difference between a constituent amount of torque applied by an actuator and the assigned amount of torque; and
    comparing each error value to a reference value, and performing a remedial action based on at least one error value exceeding the reference value.

11. The method of claim 10, wherein the remedial action includes disabling at least one actuator.

12. The method of claim 11, wherein comparing each error value includes determining a largest error value, and performing the remedial action includes disabling an actuator associated with the largest error value based on the largest error value exceeding a second threshold.

13. The method of claim 11, wherein each error value is compared to a respective error threshold, and performing the remedial action includes disabling an actuator having an error value that exceeds the respective error threshold.

14. The method of claim 11, further comprising re-estimating the total applied torque, and comparing the re-estimated total applied torque to the first threshold.

15. The method of claim 14, further comprising disabling at least one additional actuator based on based on a difference between the re-estimated total amount of applied torque and the total requested torque being greater than the first threshold.

16. The method of claim 14, further comprising continuing to apply torque by one or more remaining active actuators, based on the re-estimated total amount of applied torque being less than or equal to the first threshold.

17. A vehicle system comprising:
    a propulsion system having a plurality of independently controllable actuators, the plurality of actuators configured to apply a combined torque for propulsion of a vehicle; and
    a controller configured to perform a method including:
    monitoring the propulsion system and detecting a combined torque request, the combined torque request indicating a total requested torque to be applied to the vehicle, wherein the total requested torque is split and a portion of the total requested torque is assigned to each actuator of the plurality of actuators;
    determining a torque command for each actuator, each torque command prescribing an assigned amount of torque to be applied to a respective actuator;
    during propulsion, estimating a total applied torque provided to the vehicle, and comparing the total applied torque to the total requested torque;
    based on a difference between the total applied torque and the total requested torque being greater than a first threshold, calculating an error value for each actuator, the error value being a difference between a constituent amount of torque applied by an actuator and the assigned amount of torque; and comparing each error value to a reference value, and performing a remedial action based on at least one error value exceeding the reference value.

18. The vehicle system of claim 17, wherein the remedial action includes disabling at least one actuator.

19. The vehicle system of claim 18, wherein comparing each error value includes determining a largest error value, and performing the remedial action includes disabling an actuator associated with the largest error value based on the largest error value exceeding a second threshold.

20. The vehicle system of claim 18, wherein each error value is compared to a respective error threshold, and performing the remedial action includes disabling an actuator having an error value that exceeds the respective error threshold.

* * * * *